US006484511B2

(12) United States Patent
Eppler et al.

(10) Patent No.: US 6,484,511 B2
(45) Date of Patent: Nov. 26, 2002

(54) TURBINE CASING FOR AN AXIAL-THROUGHFLOW GAS TURBINE

(75) Inventors: Volker Eppler, Waldshut-Tiengen (DE); Thomas Kollnberger, Dättwil (CH)

(73) Assignee: Alstom (Switzerland) Ltd, Baden (CH)

(*) Notice: Subject to any disclaimer, the term of this patent is extended or adjusted under 35 U.S.C. 154(b) by 0 days.

(21) Appl. No.: 09/821,090

(22) Filed: Mar. 30, 2001

(65) Prior Publication Data

US 2001/0025479 A1 Oct. 4, 2001

(30) Foreign Application Priority Data

Mar. 31, 2000 (DE) .......................................... 100 16 082

(51) Int. Cl.[7] .................................................. F02C 7/20
(52) U.S. Cl. ............................................ 60/796; 60/752
(58) Field of Search .......................... 60/752, 796, 804, 60/39.55; 415/175

(56) References Cited

U.S. PATENT DOCUMENTS 2,417,835 A * 3/1947 Moore ........................ 60/39.55
2,575,070 A * 11/1951 Reed et al. .................... 60/752
2,599,654 A * 6/1952 Musikant ...................... 60/804
2,702,454 A 2/1955 Brown
3,088,281 A * 5/1963 Soltau et al. .................. 60/752
3,772,881 A * 11/1973 Lange ........................ 60/39.55
3,842,595 A * 10/1974 Smith et al. .................. 60/804
4,716,721 A * 1/1988 Pask et al. .................... 60/796
6,152,685 A * 11/2000 Hagi .......................... 415/175

FOREIGN PATENT DOCUMENTS

DE 19821889 A1 11/1999

* cited by examiner

*Primary Examiner*—Michael Koczo
(74) *Attorney, Agent, or Firm*—Burns, Doane, Swecker & Mathis, L.L.P.

(57) ABSTRACT

A turbine casing for an axial-throughflow gas turbine surrounds at least one hot-gas space between a compressor stage and a turbine stage and has an outer shell as an external boundary and also an inner shell which is provided separately from the outer shell and which separates the hot-gas space from the outer shell via an annular space. The inner shell is connected to the outer shell via two axial interfaces, in such a way that the annular space is sealed off relative to the hot-gas space. The turbine casing withstands higher compressor final pressures and temperatures and can be produced cost-effectively.

6 Claims, 2 Drawing Sheets

TURBINE CASING FOR AN AXIAL-THROUGHFLOW GAS TURBINE

FIELD OF THE INVENTION

The present invention relates to gas turbine, and more specifically to casings surrounding at least one hot-gas space between a compressor stage and a turbine stage.

BACKGROUND OF THE INVENTION

In the case of axial-throughflow gas turbines, as a rule, the one or more compressor stages and the one or more turbine stages are arranged on a single shaft. The highly compressed and heated air flowing out of the compressor is supplied to a combustion chamber located within the turbine casing between the compressor stage and turbine stage. Due to the high pressure values and temperatures occurring in this region, the turbine casing is exposed to high load.

The development of high-compression compressors with rising compressor final temperatures leads to increasingly more stringent requirements for the mechanical and thermal stability of the turbine casing. High-grade materials having improved properties must be found and used for the thermal and mechanical loading which increases with a rising pressure ratio. At the same time, ever larger separating-flange screw connections of the turbine casing have to be provided, in order to withstand these loads. Both of these factors increase the cost of the turbine power plants considerably.

Another limiting factor is the manufacturing methods which are employed in the field of industrial gas turbines and in which the outer shells forming the turbine casing are cast. Due to the system employed, however, the mechanical and thermal load-bearing capacity of turbine casings produced by casting methods of this kind is limited.

SUMMARY OF THE INVENTION

The present invention provides a turbine casing for an axial-throughflow gas turbine, which turbine casing can be produced cost-effectively and withstands very high pressures and temperatures. Thus, the turbine casing is capable of being operated without difficulty in the region of a compressor final pressure of more than 30 bar at temperatures of 550 to 570° C.

The turbine casing according to the invention surrounds at least one hot-gas space between a compressor stage and a turbine stage. The casing is provided with an outer shell as an external boundary, and an inner component, which is provided separately from the outer shell and which separates the hot-gas space from the outer shell with an intermediate space defined between the outer shell and the inner component. The inner component is connected to the outer shell by two axial interfaces, in such a way that the intermediate space is sealed off relative to the hot-gas space.

The turbine casing according to the invention is thus composed of an outer shell and of an inner component. As a result of the arrangement of the two integral parts, the intermediate space formed between the inner component and the outer shell has a lower pressure and a lower temperature than the hot-gas space surrounded by the inner component. This is made possible, in particular, by the intermediate space being sealed off from the hot-gas space. A predetermined pressure can be set in this intermediate space by suitable feeds to the intermediate space.

The division of the turbine casing according to the invention into an outer shell and an inner component enables the thermal and mechanical loads occurring during operation to be apportioned to the two components. In this case, the inner component, also referred to as the hot-gas component, is designed in such a way that it withstands both the circumferential stresses caused by the pressure difference between the hot-gas space and the intermediate space, and the high temperature prevailing in the hot-gas space. This hot-gas component is therefore manufactured preferably from a high-grade material.

The outer shell must have a sufficiently rigid design to be capable of transmitting the static forces of the gas turbine and of withstanding the pressure difference between the intermediate space and the ambient atmosphere. The temperature which acts on the outer shell is markedly reduced because of the separation from the hot-gas space by the inner component and the intermediate space. This thermal load may be additionally counteracted by suitable cooling-air routed to the intermediate space formed between the inner component and the outer shell. This also reduces the phenomenon of "bowing" which can occur in steam and gas turbines and is caused as a rule by deformation of the stator.

A turbine casing constructed in accordance with the invention can be operated at compressor final pressures of more than 30 bar and the associated high temperatures. As a result of the outer shell only having to meet reduced requirements from those of conventional turbine casings, the outer shell can be produced by means of conventional casting methods and simple materials, while high-grade materials are necessary only for the inner component exposed to the high temperature and pressure ranges.

In one advantageous embodiment of the turbine casing according to the invention, the inner component is connected to the outer shell by means of surface pressure acting in the axial direction. The axial direction is a direction parallel to the central axis of the turbine casing. In this case, the outer shell has preferably two inwardly continuous projections or webs that form axial interfaces between which the inner component is placed. The inner component has sufficient flexibility in the axial direction such that it maintains a tight seal against the axial interfaces with the outer shell over the entire operating cycle of the gas turbine. The sealing effect is achieved preferably by metallic surfaces. The axial interfaces of the outer shell and the surfaces of the inner component which come into contact with the axial interfaces are provided with metallic sealing surfaces. The outer shell and webs forming the axial interfaces must have a sufficiently rigid design to absorb the axial forces that result from the surface pressure created during metallic sealing. As a result of this refinement, the turbine casing according to the invention is easily produced.

In a further refinement of the turbine casing, the materials for the outer shell and for the inner component are selected such that, during operation, there is sufficient surface pressure between the interfaces of the components to achieve a good seal. The thermal longitudinal expansion coefficient of the material for the inner component is preferably selected to be lower than that for the outer shell. Different thermal expansions resulting from the different temperatures acting on the two components can be compensated for in this manner. The materials are selected in such a way that the sealing effect between the inner component and the outer shell does not decrease during operation.

A medium can be supplied under pressure into the intermediate space between the inner component and outer shell, for example, a pressure of 16 bar can be maintained in the intermediate space in the case of a pressure of 32 bar in the hot-gas space. In this case, the inner component and the outer shell only have to be capable in each case of withstanding a pressure difference of 16 bar.

The turbine casing according to the invention also makes it possible so that, even under high pressure conditions of the compressor and with large diameters of the components, smaller separating-flange screw connections and simpler materials and geometries can be selected for the outer shell and the inner component. This, too, leads to a reduction in the costs for producing a turbine casing of this type.

A further advantage of the present invention is the simple production of the casing, in which the inner component merely has to be clamped between the two axial interfaces. There is no need, in this case, for further connection techniques which could lead to thermal stresses or cracking.

BRIEF DESCRIPTION OF THE DRAWINGS

The turbine casing according to the invention is explained further hereafter, without limiting the intended scope of the invention, by means of an exemplary embodiment, in conjunction with the drawings in which.

DESCRIPTION OF THE PREFERRED EMBODIMENTS

Figure 1:
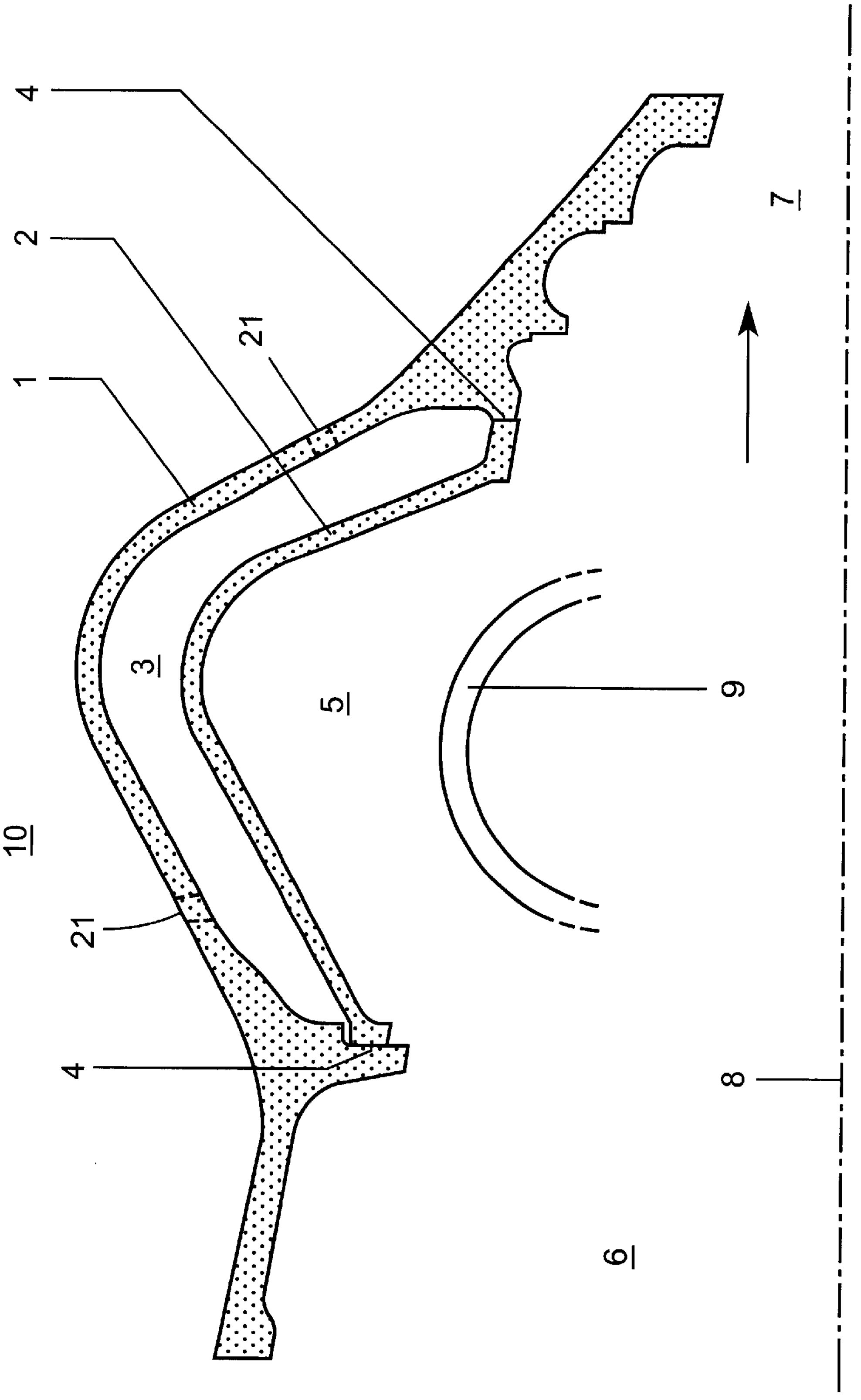
FIG. 1 illustrates a section through an exemplary turbine casing.

An example of a turbine casing for an axial-throughflow gas turbine is illustrated in FIG. 1. The figure shows the upper part of the casing structure arranged symmetrically about a center axis 8. The center axis corresponds to the gas turbine axis along which the shaft turns together with the turbine and compressor blades. The casing consists of the outer shell 1 and of the inner component 2. In the illustrated embodiment, both the outer shell 1 and the inner component 2 surround the hot-gas space 5 annularly. The compressor stage 7 (not illustrated) is adjacent on the right side and the expansion space 6 with the turbine stage (not illustrated) is adjacent on the left side. The combustion chamber wall 9 is indicated diagrammatically in the hot-gas space 5. The combustion chamber may have any desired shape. In this case, both annular combustion chambers and multistage combustion chambers may be provided. The hot-gas space 5 contains compressed air at high temperature, which has flowed in from the compressor stages 7, and also the hot gases escaping from the combustion chamber.

The hot-gas space 5 is surrounded by the inner component 2. Between the inner component 2 and the outer shell 1 an intermediate annular space 3 is formed and sealed off from the hot-gas space 5 by the axial interfaces 4. The axial interfaces 4 are designed as metallic sealing surfaces that mate with the end faces of the inner component 2. Under normal operating conditions, the length between the axial interfaces and the corresponding length between the mating end faces of the inner component are chosen so that sufficient surface pressure for metallic sealing is brought about. In this case, during assembly, the inner component 2 is clamped to the defined assembly gap between the two interfaces 4. In the transient operating range, during the start-up and the shutdown, an additional element (for example, a built-in diaphragm seal) assumes the sealing function. Under normal operating conditions, the outer shell 1 and inner component 2 are braced relative to one another. In this case, the interfaces themselves are produced as radially continuous elevations or webs, the sealing surfaces of which run perpendicularly to the center axis 8. Both the outer shell 1 and the inner component 2 have an outwardly curved shape in this region. This shape is conducive to clamping the inner component 2 between the two axial interfaces 4.

The sealing off between the hot-gas space 5 and the annular space 3 allows markedly different pressure conditions in the annular space from those which prevail in the hot-gas space. The inner component 2 therefore has to support only the pressure difference between the hot-gas space and the annular space, while the outer shell 1 has to withstand only the pressure difference between the annular space 3 and the surroundings 10, that is to say atmospheric pressure, and also the static forces of the gas turbine. Furthermore, the separation of the outer shell 1 from the hot-gas space 5 via the inner component 2 and the annular space 3 lowers the thermal load on the outer shell 1, so that the latter can be manufactured from normally heat-resistant material.

As regards conventionally designed turbine casings, the entire casing would have to be formed from the higher-grade material. In this case, too, a casing of this type in cast form would possibly not be capable of withstanding the high internal pressures.

In contrast to this, in the turbine casing according to the invention, only the inner component has to be formed from a high-grade heat-resistant material, while the outer shell can be cast in the conventional way. On the one hand, this reduces the costs and, on the other hand, this design withstands a higher compressor final pressure.

Figure 2:
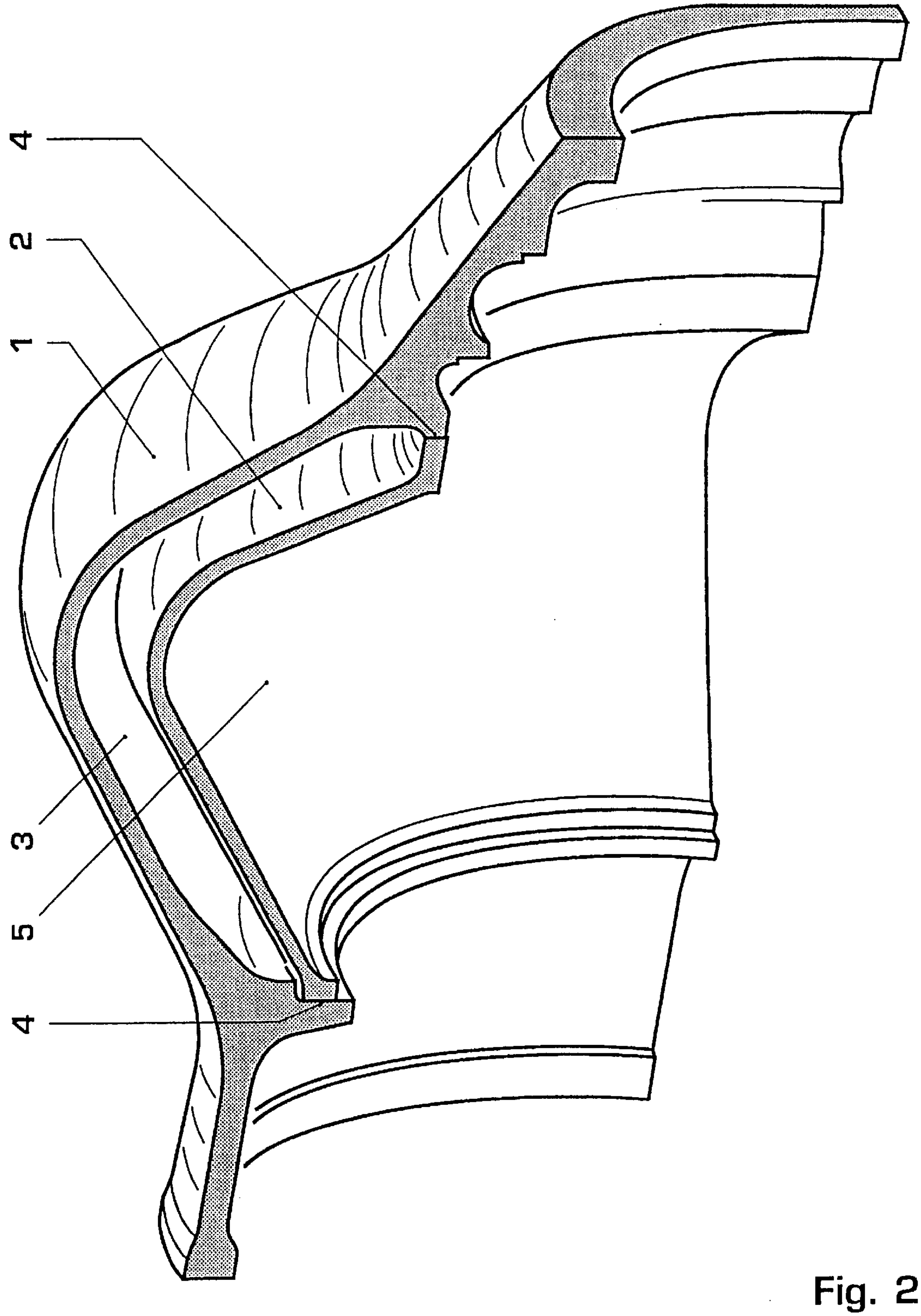
FIG. 2 illustrates a perspective sectional view of the turbine casing shown in FIG. 1.

FIG. 2 shows the same exemplary embodiment again in a perspective sectional illustration. In this view, the curved shape of the outer shell 1 and of the inner component 2, together with the annular space 3 located between them, can be seen very clearly. The two axial interfaces 4, which are formed by continuous webs directed inwardly from the outer shell 1, are also evident. These interfaces 4 are manufactured preferably integrally with the outer shell.

The outer shell 1 of a turbine casing of this type can be produced very simply by means of a casting technique. The inner component 2 separating the hot-gas space 5 from the annular space 3 must then merely be clamped between the two interfaces 4.

Suitable material differences between the material of the inner component 2 and the material of the outer shell 1 makes it possible to exert a virtually temperature-independent surface pressure of the inner component 2 on the axial interfaces 4. Feeds or orifices 21, such as those illustrated by dashed lines in FIG. 1, can be provided for supplying a medium, for example, a cooling medium such as air, into the annular space 3. A predetermined pressure can be maintained in the annular space via these feeds

What is claimed is:

1. A turbine casing for at least one hot-gas space between a compressor stage and a turbine stage, said casing comprising:

an outer shell forming an external boundary of said casing; and an inner component separating the hot-gas space from the outer shell wherein the inner component has a radially outwardly curved shape, an annular space being defined between the inner component and the outer shell, and the inner component being connected to the outer shell at two axial interfaces, in such a way that the annular space is sealed off from the hot-gas space.

2. The turbine casing as claimed in claim 1, wherein the inner component is clamped between the axial interfaces, so that the connection to the outer shell is made by means of surface pressure acting in the axial direction.

3. The turbine casing as claimed in claim 1, wherein the axial interfaces are designed as metallic sealing surfaces.

4. The turbine casing as claimed in claim 1, wherein the outer shell and the inner component surround the hot-gas space annularly.

5. The turbine casing as claimed in claim 1, wherein the outer shell has one or more orifices for supplying a medium to the annular space.

6. A turbine casing for at least one hot-gas space between a compressor stage and a turbine stage, said casing comprising:

an outer shell forming an external boundary of said casing; and an inner component separating the hot-gas space from the outer shell, an annular space being defined between the inner component and the outer shell, and the inner component being connected to the outer shell at two axial interfaces, in such a way that the annular space is sealed off from the hot-gas space, the inner component is clamped between the axial interfaces, so that the connection to the outer shell is made by means of surface pressure acting in the axial direction, wherein the outer shell and the inner component are formed from different materials so that, when the gas turbine is in operation, sufficient surface pressure is established at the axial interfaces to seal off the annular space relative to the hot-gas space.

* * * * *